United States Patent [19]

Thomsen

[11] 4,095,914
[45] Jun. 20, 1978

[54] FASTENER FOR SECURING A SHAFT TO A PLATE

[76] Inventor: Wilbur J. Thomsen, Round Lake, Minn. 56167

[21] Appl. No.: 772,352

[22] Filed: Feb. 28, 1977

[51] Int. Cl.² .......................................... F16B 39/36
[52] U.S. Cl. .................... 403/389; 403/290; 151/19 R; 151/24; 85/9 R
[58] Field of Search ............... 151/19 R, 24, 31, 68, 151/70, 28, 29; 85/9 R, 1 SS, 8.1; 403/362, 389, 290

[56] References Cited

U.S. PATENT DOCUMENTS

| 904,341 | 11/1908 | Lindstrom | 151/19 R |
|---|---|---|---|
| 1,796,208 | 3/1931 | Mahoney | 151/19 R |
| 2,383,692 | 8/1945 | Smith | 151/19 R |
| 2,959,982 | 11/1960 | Cadwallader | 403/362 |
| 3,397,901 | 8/1968 | Larrivee | 248/151 |

FOREIGN PATENT DOCUMENTS

| 59,292 | 1/1954 | France | 151/19 R |
|---|---|---|---|
| 1,309,150 | 10/1962 | France | 151/19 R |
| 704,982 | 4/1966 | Italy | 85/9 R |

Primary Examiner—Marion Parsons, Jr.

[57] ABSTRACT

Fastening apparatus is disclosed comprising a hollow cone, the tapered end of the cone having screw threads thereon for receiving a mating nut having a tapered opening conforming to the dimensions of the tapered end of the cone, the tapered opening having mating screw threads therein. The tapered end of the cone has a slot or a plurality of slots projecting from the outer surface of the cone member towards the opening. The cone member is adapted to be received on a shaft, the threading of the nut on the end of the cone after the cone member is placed on the shaft locking the cone to the shaft. A flange may be provided towards the base of the cone member. Additionally, the cone member may be locked onto the shaft by an additional locking member such as a set screw passing through the cone member such as the flange portion thereof. A plate may be provided which extends between the base of the cone and the tapered end of the cone member and is secured thereto through the head of the set screw in one embodiment.

1 Claim, 2 Drawing Figures

FASTENER FOR SECURING A SHAFT TO A PLATE

SUMMARY OF THE INVENTION

The present invention relates to fastener apparatus comprising a cone member having a longitudinal opening, the opening running the full length of the cone. The opening is adapted to receive a shaft member, the cone member having screw threads on the surface thereof, the screw threads extending longitudinally from the tapered end of the base of the cone. Longitudinal slot members are provided in the tapered end of the cone, the longitudinal slot members projecting from the screw threads into the opening. A nut member having mating threads therein adapted to threadably engage the threads on the cone is provided, the mating threads extending around a cone shaped opening in the nut. The surface of the cone shaped opening is substantially the same dimensions as the outer conical surface of the tapered end of the cone member. The opening in the cone may be adapted to slidably receive the shaft that fits into the opening.

The base of the cone may terminate in a flange extending away from the opening.

A locking member may be provided for securing the cone to a shaft adapted to be received in the opening.

The locking member may comprise a set screw extending through the cone and into the opening and in another embodiment, the set screw may be positioned to extend through the flange.

A plate may be provided which is removably attached to the cone member, the plate member projecting towards the screw threads.

The plate member may be attached to the flange through a locking member such as a set screw, in one embodiment the set screw having a head projecting beyond the flange and the plate having an opening therein for receiving the head of the set screw. A plate securing member extends from the head of the set screw for holding the plate on the apparatus.

The plate securing member may comprise an opening in the head of the set screw in combination with a key member insertable through the opening in the set screw, the key member being adapted for engaging the surface of the plate and for holding the plate against the flange when the plate is positioned on the set screw.

DETAILED DESCRIPTION

Locking nut and bolt assemblies are disclosed in the prior art U.S. Patents to Dresdner No. 3,312,264; Kellogg, et al., No. 3,052,130; Antal No. 2,828,662; Lord No. 2,508,409; Johnsen No. 2,298,014; Blackburn No. 2,020,989; Berg No. 1,477,935; and Buffington No. 597,260.

It is an object of the present invention to provide fastener apparatus which may be positioned over a shaft such as a smoothed faced shaft so that the fastener can be locked thereon.

It is another object of the present invention to provide a fastener assembly which may be positioned over a shaft and in which a device to be held in place on the shaft may be positioned on the fastener and secured thereto as well as the shaft assembly.

These and other objects have been achieved according to the present invention and will become apparent by reference to the disclosure and claims that follow as well as the appended drawing.

Figure 1:
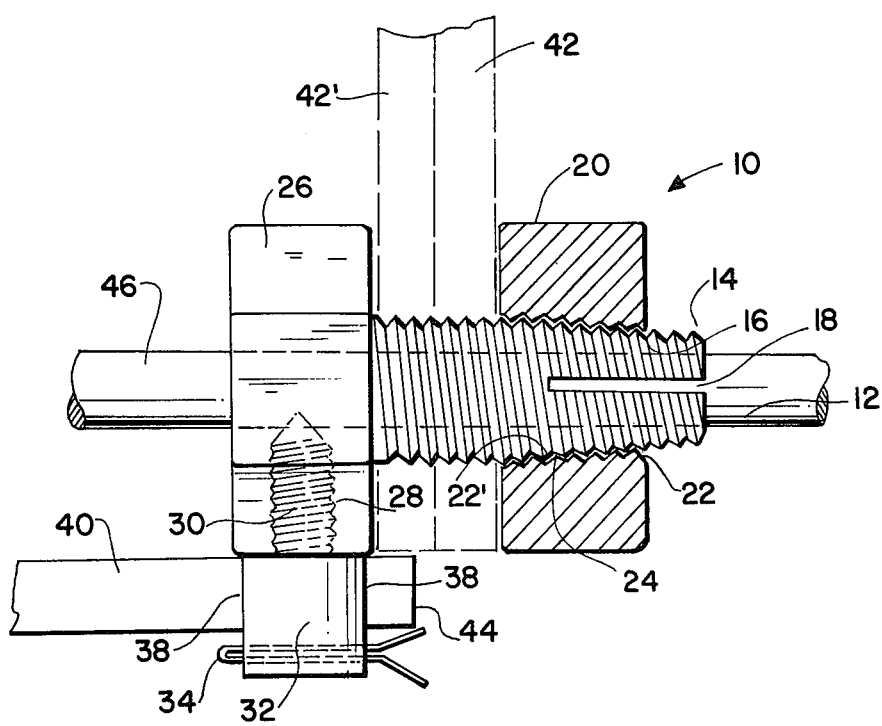
FIG. 1 comprises a partial side elevation partially in section illustrating fastener apparatus comprising a cone member having threads extending around the tapered end therein and over which a nut having a cone shaped threaded opening is positioned is illustrated, the tapered end of the cone shaped member having slots therein according to one embodiment of the present invention.
Figure 2:
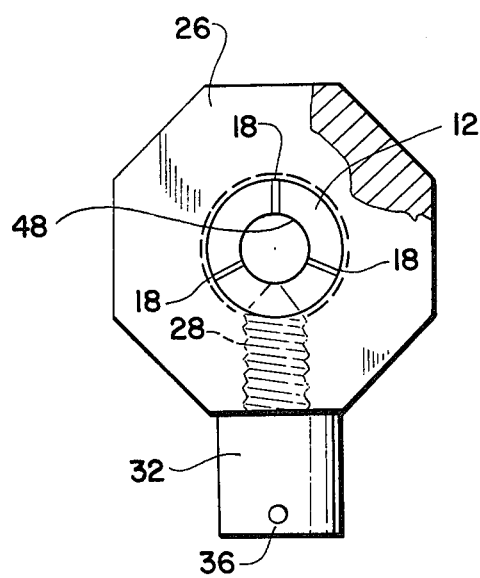
FIG. 2 comprises a front elevation partially in section illustrating a cone shaped member having screw threads over the tapered end thereof and slots in the tapered end thereof and a locking member for securing the cone member at the base thereof to a shaft over which the cone member may be positioned according to another embodiment of the present invention.

Referring to the drawing and FIGS. 1 and 2 therein, fastener apparatus 10 is illustrated comprising a cone member 12, the tapered end 14 thereof having threads 16 thereon and a plurality of slots 18 positioned around the tapered end 14, slots 18 extending from the outer periphery of the cone member 12 towards an opening 48 longitudinally extending the full length of the cone apparatus 12. The base of the cone apparatus 12 terminates in a flange-like extension 26. The shaft 46 is adapted to be positioned in the opening 48 and is preferably adapted to be slidably inserted into the opening 48. A nut 20 having a conically tapered surface 22 that is of the same dimensions as the cone shaped surface 14 is provided, mating screw threads 24 extending from the surface 22 for threadably receiving the screw threads 16 on cone member 12. A set screw comprising a set screw head 32 and threaded shaft 30 is provided to threadably engage threaded opening 28 to lock the cone member 12 to the shaft 46 through the head 26. A plate 40 having an opening 38 therein may be positioned over the head 32 so that the end 44 of plate 40 projects from the base towards the tapered end of the cone member 12. A key such as a cotter key 34 is positioned in an opening 36 on head 32 to hold the plate 40 in position. Material to be held together or in place on the shaft 46 is positioned in between the flange 26 and the nut 20, the material or plates 42 and 42' having a flat bottom abutting against the end 44 of plate 40 so that once positioned on the cone member 12, the material 42 will not rotate with respect to shaft 46.

In use, the cone member 12 is positioned over the shaft 46 through opening 48 and the set screw shaft 30 is turned in opening 28 until the pointed end thereof engages the shaft 46 thereby holding the cone member 12 on the shaft 46. The material to be held together comprising plate 42 and plate 42' are positioned on the cone member 12 and the nut 20 then threaded over the tapered end of the cone 12 until the tapered end is clamped onto the shaft 46 by positioning the tapered end of the surface 22 towards the base of the cone member 12 thereby causing the tapered end of cone 12 to be pinched together through the openings 18 and secured to the shaft 46. The plate 40 is then positioned so that the end 44 thereof abuts the end of the plate assembly 42 and 42' after which the cotter key 34 is inserted in opening 36.

Although the invention has been described by reference to some embodiments, it is not intended that the novel fastener apparatus be limited thereby but that modifications thereof are intended to be included as falling within the broad scope and spirit of the foregoing disclosure, the following claims and the appended drawing.

What is claimed is:

1. Fastener apparatus comprising cone means having a longitudinal opening, said opening running the full length of said cone means, said opening adapted to receive shaft means, said cone means having screw threads on the surface extending longitudinally from the tapered end towards the base thereof, longitudinal slot means in the tapered end of said cone means, said longitudinal slot means projecting from said screw threads into said opening, nut means having mating threads therein adapted to threadably engage said threads on said cone means, said mating threads extending around a cone shaped opening in said nut means, the surface of said cone shaped opening being substantially the same dimensions as the outer conical surface of the tapered end of said cone means, the base of said cone means terminating in flange means extending away from said opening, plate means removably attached to said flange through locking means, said plate means projecting towards said screw threads, said locking means comprising a set screw, said set screw extending into a head projecting beyond said flange, said plate having an opening therein for receiving the head of said set screw, plate securing means extending from said head of said set screw for holding said plate on said apparatus, said plate securing means comprising an opening in said head of said set screw, key means insertable through said opening in said head for engaging the surface of said plate and for holding said plate against said flange when said plate is positioned on said set screw.

* * * * *